(12) United States Patent
McConnell et al.

(10) Patent No.: US 9,179,497 B1
(45) Date of Patent: Nov. 3, 2015

(54) DISTRIBUTION OF SENSOR DATA AMONG A GROUP OF WIRELESS COMMUNICATION DEVICES

(71) Applicant: Sprint Communications Company L.P., Overland Park, KS (US)

(72) Inventors: Von Karl McConnell, Leawood, KS (US); Lyle T. Bertz, Lee's Summit, MO (US); Lyle Walter Paczkowski, Mission Hills, KS (US); Joao Carlos Osorio Gouvea Teixeira de Magalhaes, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 42 days.

(21) Appl. No.: 14/215,434

(22) Filed: Mar. 17, 2014

(51) Int. Cl.
*H04W 84/18* (2009.01)
*H04L 29/08* (2006.01)

(52) U.S. Cl.
CPC .................................... *H04W 84/18* (2013.01)

(58) Field of Classification Search
None
See application file for complete search history.

(56) References Cited

U.S. PATENT DOCUMENTS

| | | | |
|---|---|---|---|
| 6,625,437 B1 * | 9/2003 | Jampolsky et al. | 455/405 |
| 7,110,773 B1 | 9/2006 | Wallace et al. | |
| 7,558,526 B2 | 7/2009 | Guo | |
| 7,894,825 B2 | 2/2011 | Wallace et al. | |
| 2006/0148477 A1 | 7/2006 | Reilly | |
| 2007/0133469 A1 * | 6/2007 | Shin et al. | 370/331 |
| 2009/0160694 A1 | 6/2009 | Di Flora | |
| 2010/0311401 A1 * | 12/2010 | Oh et al. | 455/417 |
| 2014/0122280 A1 * | 5/2014 | Jung et al. | 705/26.1 |
| 2014/0163867 A1 * | 6/2014 | Fernandez | 701/425 |

FOREIGN PATENT DOCUMENTS

| | | |
|---|---|---|
| EP | 2036055 | 12/2007 |
| WO | 2007149947 | 12/2007 |

* cited by examiner

Primary Examiner — Benjamin H Elliott, IV (57) ABSTRACT

A wireless communication network exchanges wireless data with wireless communication devices and transfers device data indicating device locations and device status to a network server. A sensor system detects a trigger condition and responsively determines proximate wireless communication devices. The sensor system transfers indications of the trigger condition and the currently proximate wireless communication devices to the network server. The network server processes the device data, trigger condition, and proximate wireless communication devices to generate notice data indicating the trigger condition and to select at least one of the wireless communication devices for receipt of the notice data. The network server transfers the notice data to the selected wireless communication devices over the wireless communication network.

20 Claims, 8 Drawing Sheets

DISTRIBUTION OF SENSOR DATA AMONG A GROUP OF WIRELESS COMMUNICATION DEVICES

TECHNICAL BACKGROUND

In wireless communication networks, wireless base stations communicate with wireless communication devices as their users move about. During this time, the wireless communication devices transition from off-net to on-net and from idle mode to active mode. The wireless communication networks generate usage data to characterize these wireless services, and the usage data indicates the device locations and the device status.

To extend the reach of wireless networks, small base stations have been developed for personal use. For example, a homeowner may install a small wireless base station to cover their property. The small base station communicates with proximate wireless devices in the residence—and can detect unknown devices that attempt to access the small cell. These same locations that have small cells may also have sensor systems to detect alarms, visitors, environmental conditions, and the like. These sensor systems may contact remote users over wireless networks to report various conditions, such as fires and intrusions.

Unfortunately, the ability to distribute this sensor data to remote wireless communication devices has not been efficiently and effectively integrated with the wireless networks and/or their affiliated small cell base stations.

TECHNICAL OVERVIEW

A wireless communication network exchanges wireless data with wireless communication devices and transfers device data indicating device locations and device status to a network server. A sensor system detects a trigger condition and responsively determines proximate wireless communication devices. The sensor system transfers indications of the trigger condition and the currently proximate wireless communication devices to the network server. The network server processes the device data, trigger condition, and proximate wireless communication devices to generate notice data indicating the trigger condition and to select at least one of the wireless communication devices for receipt of the notice data. The network server transfers the notice data to the selected wireless communication devices over the wireless communication network.

DETAILED DESCRIPTION

Figure 1:
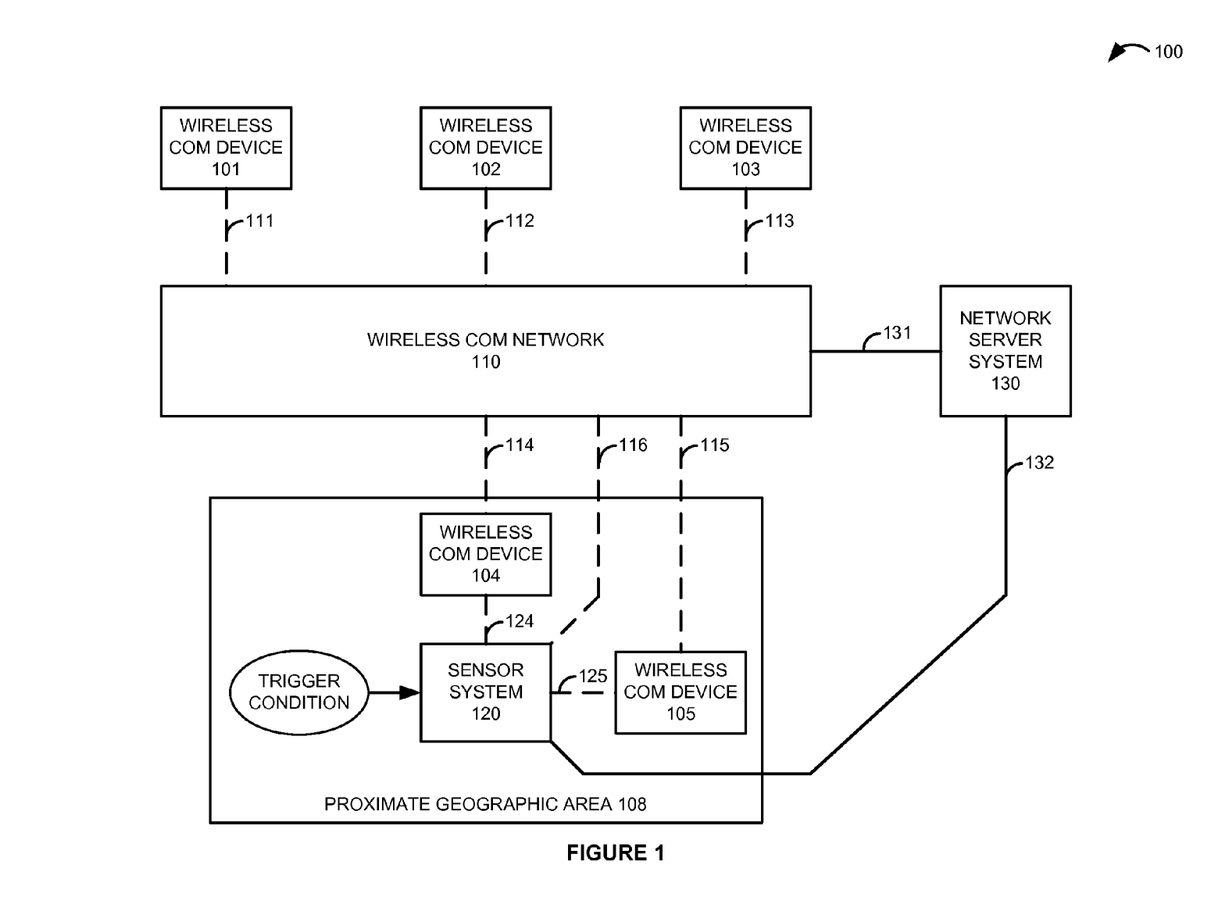
FIG. 1 illustrates a communication system to distribute notice data indicating a trigger condition among a group of wireless communication devices.

FIG. 1 illustrates communication system 100 to distribute notice data indicating a trigger condition among a group of wireless communication devices 101-105. Communication system 100 comprises wireless communication devices 101-105, wireless communication network 110, sensor system 120, and network server system 130. Sensor system 120 is located within proximate geographic area 108, and wireless communication devices 104-105 are currently present within proximate geographic area 108. Proximate geographic area 108 is bounded by the geographic ability of sensor system 120 to communicate with the wireless communication devices using radio waves over the air, although the radio range may be restricted to size area 108 to cover only a single residence, building, site, sector, or the like.

Wireless communication network 110 exchanges wireless data with wireless communication devices 101-105 over respective wireless links 111-115. Sensor system 120 exchanges wireless data with proximate wireless communication devices 104-105 over respective wireless links 124-125. Wireless communication network 110 and sensor system 120 wirelessly communicate over wireless link 116. Wireless communication network 110 and network server system 130 communicate over data link 131. Sensor system 120 and network server system 130 communicate over data link 132.

Wireless communication network 110 generates usage data that characterizes the wireless communications over wireless links 111-116—typically for accounting and management purposes. Some of this usage data indicates locations for wireless communication devices 101-105, such as their geographic coordinates or the geographic coordinates of a bounded geographic area like their serving wireless sector. Some of this usage data indicates status for wireless communication devices 101-105, such as their on-net/off-net status, active/idle status, application status, mobility status, wireless signal quality status, calendar data, billing/accounting status, Quality-of-Service (QoS) priority, and/or some other device data. Wireless communication network transfers device data indicating device locations and device status to network server system 130. In some examples, wireless communication devices 101-105 and sensor system 120 also transfer pertinent device data to network server system 130.

Sensor system 120 detects a trigger condition at proximate geographic area 108. The trigger condition may vary in different examples. In some examples, the trigger condition is the presence of a person at a specific point, like a doorway. In other examples, the trigger condition is a wireless communication attachment attempt by another wireless communication device in geographic area 108. The trigger condition could be an environmental threshold, emergency alarm, or some other detectable physical event.

In response to trigger detection, sensor system 120 determines the currently proximate wireless communication devices—wireless communication devices 104-105 in this example. Sensor system 120 may detect the proximity of a wireless communication device through wireless communications between the proximate devices and sensor system 120, or through the detection of wireless communications between the proximate device and wireless communication network 110. Sensor system 120 may detect the proximity of a wireless communication device by processing local power consumption data. Other proximity detection techniques could be used. Sensor system 120 transfers indications of the trigger condition and the currently proximate wireless communication devices 104-105 to network server system 130. Sensor system 120 may use wireless link 116 or data link 132 for the transfer, although one of these links could be omitted in some examples.

Network server system 130 processes the device data, the indication of the trigger condition, and the indication of the currently proximate wireless communication devices 104-105 to generate the notice data indicating the trigger condition. The content of the notice data may vary by the wireless device receiving the notice and its location/status. For example, wireless communication device 101 may receive the notice, "wireless device X is attempting to access WiFi in geographic area 108, do you want to allow WiFi access or communicate with this device?" and proximate communication device 105 may receive the notice, "do not answer the door and do not accept communications from device X."

Network server system 130 also processes the device data, the indication of the trigger condition, and the indication of the currently proximate wireless communication devices 104-105 to select at least one of the wireless communication devices 101-105 for receipt of the notice data. The selection of wireless devices to receive the notice data may vary based on several factors including: idle mode status, mobility status, wireless signal quality, device calendar data, user instructions, device priorities, device status, device location, and the like. For example, a wireless device having a top-tier priority may be selected if it is proximate, but if no top-tier devices are proximate, then notice data is sent to all top-tier devices that are currently in idle mode on wireless communication network 110. A scoring system could be used with several weighted parameters being processed to individually score each available wireless device for notice receipt. Wireless devices having the highest score (or a score above a threshold) could receive the notice.

Server system 120 transfers the notice data indicating the trigger condition for delivery to the selected wireless communication devices over wireless communication network 110, although links 124 and 125 may also be used. Wireless communication network 110 wirelessly transfers the notice data indicating the trigger condition to the selected wireless communication devices.

Although a static situation is depicted, wireless communication devices 101-105 move around and may or may not be present within proximate geographic area 108 at any given time. Likewise, wireless communication devices 101-105 may or may not be in communication with wireless communication network 110 at any given time. Wireless communication devices 101-105 may or may not be in communication with sensor system 120 at any given time.

Wireless communication devices 101-105 comprise phones, computers, media players, internet appliances, gaming units, or some other suitable apparatus with a wireless transceiver. Wireless communication devices 101-105 include antennas, signal processing circuitry, data processing circuitry, memory, software, user interfaces, power supply, and the like.

Wireless communication network 110 utilizes Long Term Evolution (LTE), Evolution Data Optimized (EVDO), High Speed Packet Access (HSPA), Code Division Multiple Access (CDMA), Global System for Mobile communication (GSM), Wireless Fidelity (WiFi), and/or some other wireless communication protocol. Wireless communication network 110 includes base stations, routers, gateways, servers, and the like. Wireless communication links 111-116 and 124-125 comprises LTE, EVDO, HSPA, CDMA, GSM, WiFi, or some other wireless communication links.

Sensor system 120 comprises sensors, processing circuitry, memory, software, user interfaces, communication transceivers, and the like. The sensors may be antennas, radios, cameras, microphones, electromagnetic probes, motion detectors, environmental devices, and the like. In some examples, sensor system 120 comprises an integrated LTE eNodeB and WiFi hotspot.

Network server system 130 comprises a computer and communication platform configured with software. Network server system 130 may be a portion of wireless communication network 110. Network server system 130 may be integrated within other systems and may be geographically distributed. Data links 131-132 could use various media, such as the air, space, glass, metal, plastic, and the like. Data links 131-132 could use various protocols, such as Ethernet, Internet, Diameter, Packet Radio, and the like. Data links 131-132 are representative and may include intermediate devices, systems, and networks.

Figure 2:
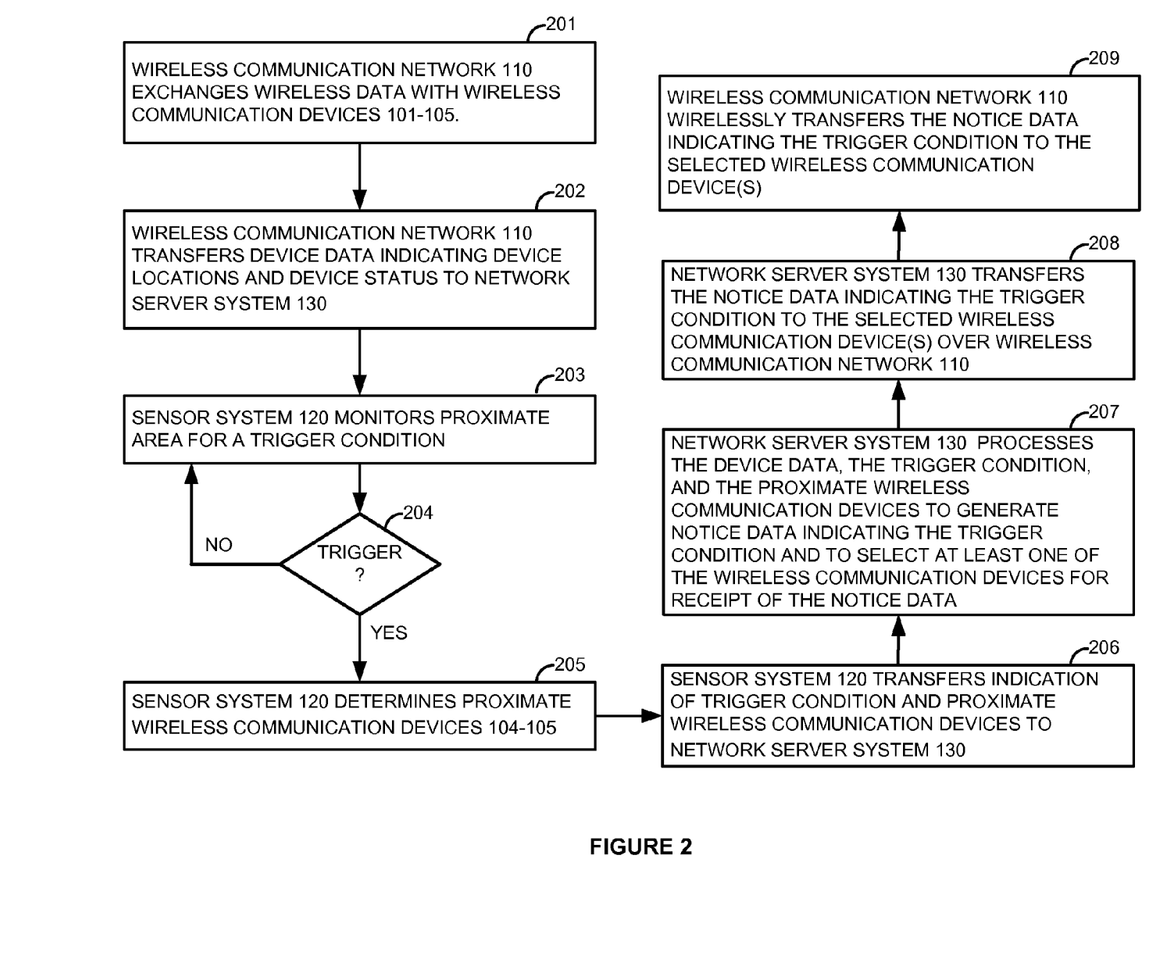
FIG. 2 illustrates the operation of a communication system to distribute notice data indicating a trigger condition among a group of wireless communication devices.

FIG. 2 illustrates the operation of communication system 100 to distribute notice data indicating a trigger condition among wireless communication devices 101-105. Wireless communication network 110 exchanges wireless data with wireless communication devices 101-105 (201). Wireless communication network 110 transfers device data for wireless communication devices 101-105 to network server system 130 (202). The device data indicates locations and status for wireless communication devices 101-105. The device data may also include on-net/off-net status, active/idle status, application status, mobility status, wireless signal quality status, calendar data, billing/accounting status, QoS priority, and/or some other device data.

Sensor system 120 monitors proximate geographic area 108 for a trigger condition (203). The trigger condition may vary, and in some examples, the trigger condition is a wireless communication attachment attempt by another wireless communication device in geographic area 108. The trigger condition could be environmental, such as a temperature reading, radiation level, or some other detectable physical event.

If the trigger condition is detected (204), then sensor system 120 determines the currently proximate wireless communication devices—wireless communication devices 104-105 in this example (205). Sensor system 120 may detect the proximity of a wireless communication device through wireless communications between the proximate device and sensor system 120. Sensor system 120 may also detect wireless transmissions above a power threshold from the proximate device to wireless communication network 110. Sensor system 120 may detect the proximity of a wireless communication device by processing local power consumption data that characterizes device charging. Sensor system 120 transfers indications of the trigger condition and the currently proximate wireless communication devices 104-105 to network server system 130 (206).

Network server system 130 processes the device data, the indication of the trigger condition, and the indication of the currently proximate wireless communication devices 104-105 to generate the notice data indicating the trigger condition (207). The content of the notice data may vary by the trigger condition. For example, wireless communication device 101 may receive the notice, "Charlie is detected by your home WiFi" and proximate communication device 105 may receive the notice, "Charlie is here."

Network server system 130 also processes the device data, the indication of the trigger condition, and the indication of the currently proximate wireless communication devices 104-105 to select at least one of the wireless communication devices 101-105 for receipt of the notice data (207). The selection of wireless devices to receive the notice data may vary based on several factors including: idle mode status, mobility status, wireless signal quality, device calendar data, user instructions, device priorities, device status, device location, and the like. For example, a wireless device having no calendar conflicts may be selected if it is proximate, but if no such devices are proximate, then notice data is sent to the on-net wireless device that is geographically closest to geographic area 108.

Server system 120 transfers the notice data indicating the trigger condition for delivery to the selected wireless communication devices over wireless communication network 110 (208). Wireless communication network 110 wirelessly transfers the notice data indicating the trigger condition to the selected wireless communication devices (209). The wireless transfer of notice data may take the form of a text message, data message, electronic mail, audio message, video message, and the like.

Figure 3:
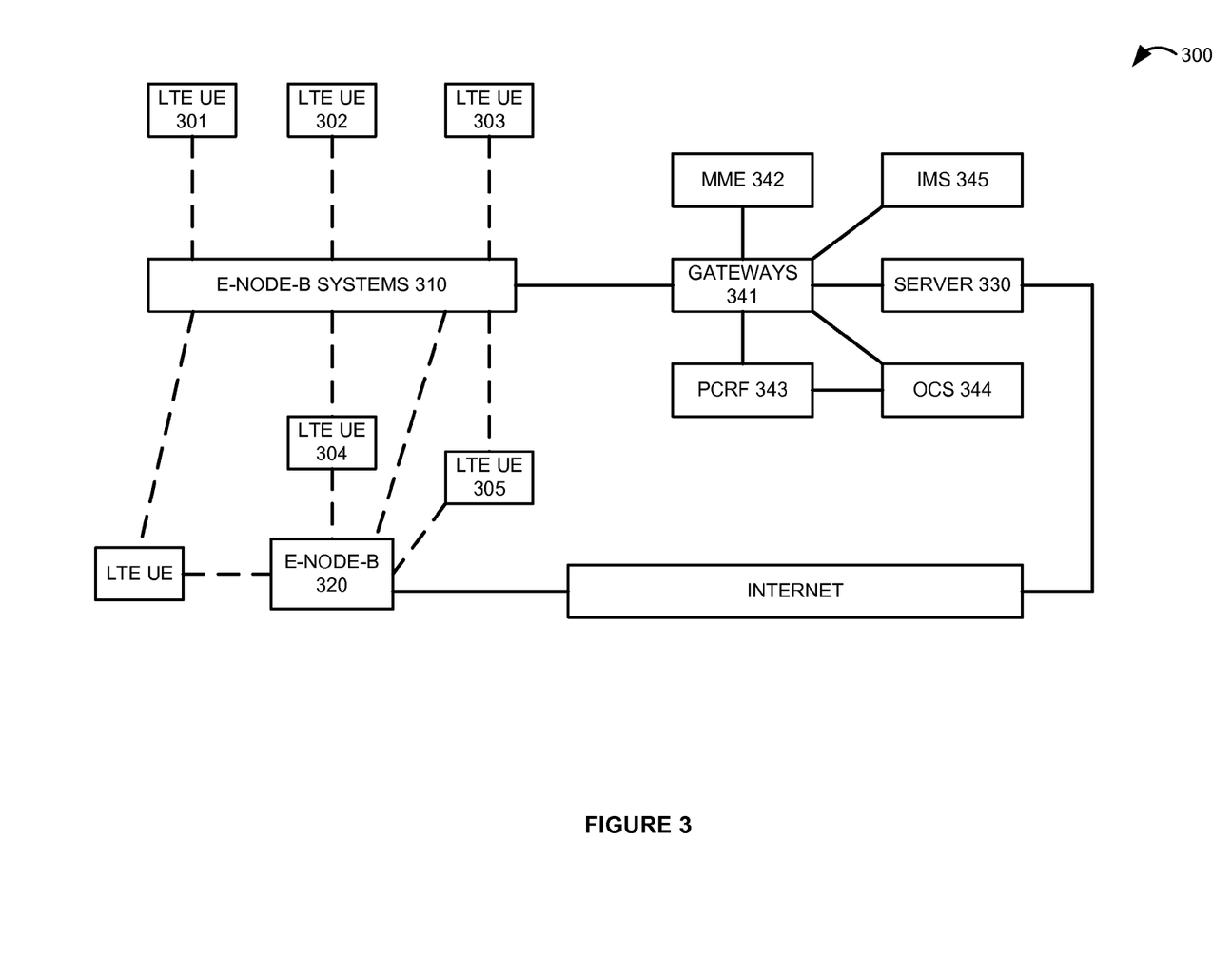
FIG. 3 illustrates a Long Term Evolution (LTE) system to distribute notice data indicating a trigger condition among a group of wireless communication devices.

FIG. 3 illustrates communication system 300 to distribute notice data indicating a trigger condition among LTE User Equipment (UE) 301-305. Communication system 300 comprises LTE UEs 301-305, LTE eNodeB systems 310, eNodeB 320, server 330, Gateways 341 (such as service gateways, packet data network gateways, 2G/3G, and WiFi gateways), Mobility Management Entity (MME) 342, Policy, Charging, and Rules Function (PCRF) 343, On-line Charging Server (OCS) 344, and Internet Multimedia Subsystem (IMS) 345. In communication system 300, eNodeB 320 is an example of sensor system 120 discussed above, although sensor system 120 may take other forms.

LTE eNodeB systems 310 exchange wireless data with LTE UEs 301-305. LTE eNodeB 320 exchanges wireless data with proximate LTE UEs 304-305. Although a static situation is depicted, UEs 301-305 move around and may or may not be geographically proximate to eNodeB 320 at any given time. UEs 301-305 may or may not be in communication with eNodeB 320 or eNodeB systems 310 at any given time.

Communication system 300 generates usage data that characterizes the LTE communications with UEs 301-305. Communication system 300 selects device location and status data from the usage data and transfers the device location and status data to server 330. Device location data for UEs 301-305 may comprise device geographic coordinates or the geographic coordinates of a bounded geographic area like a serving wireless sector. UEs 301-305, eNodeB systems 310, and MME 342 can supply device location data.

In addition to location data, MME 342 can supply on-net/off-net status and active/idle mode status for UEs 301-305. UEs 301-305, gateways 341, MME 342, and IMS 345 can supply application status data that describes the applications currently running in UEs 301-305. UEs 301-305, eNodeB systems 310, and MME 342 can supply mobility status data that indicates velocities or velocity classes for UEs 301-305. UEs 301-305, eNodeB systems 310, and MME 342 can supply wireless signal quality data that characterizes signal strength, frequency band, throughput, jitter, and the like. UEs 301-305 can supply their calendar data indicating user appointments and time conflicts. PCRF 343 and OCS 344 can supply billing and accounting status for UEs 301-305. MME 342, PCRF 343, and IMS 345 can supply Quality-of-Service (QoS) priorities and user instructions for UEs 301-305.

LTE eNodeB 320 detects an LTE attachment attempt by an LTE UE or detects a proximate (high power) wireless transmission from the LTE UE to eNodeB systems 310. In response to LTE attachment/transmission detection, eNodeB 320 determines the currently proximate LTE UEs—UEs 304-305 in this example. LTE eNodeB 320 transfers an indication of the attachment attempt (or transmission) and the currently proximate UEs 304-305 to server 330. LTE eNodeB 320 may use eNodeB systems 310 or an Internet link for the transfer.

Server 330 processes the device location and status data, the indication of the LTE attachment/transmission, and the indication of the proximate UEs 304-305 to generate the notice data indicating the LTE attachment/transmission. Server 330 also processes this data to select at least one of UEs 301-305 for receipt of the notice data. The selection of UEs to receive the notice data may vary based on several factors including: idle mode status, mobility status, wireless signal quality, device calendar data, user instructions, device priorities, device status, device location, and the like. Server 330 transfers the notice data indicating the LTE attachment/transmission to the selected UEs over eNodeB systems 310, although an internet link and eNodeB 320 may also be used.

Figure 4:
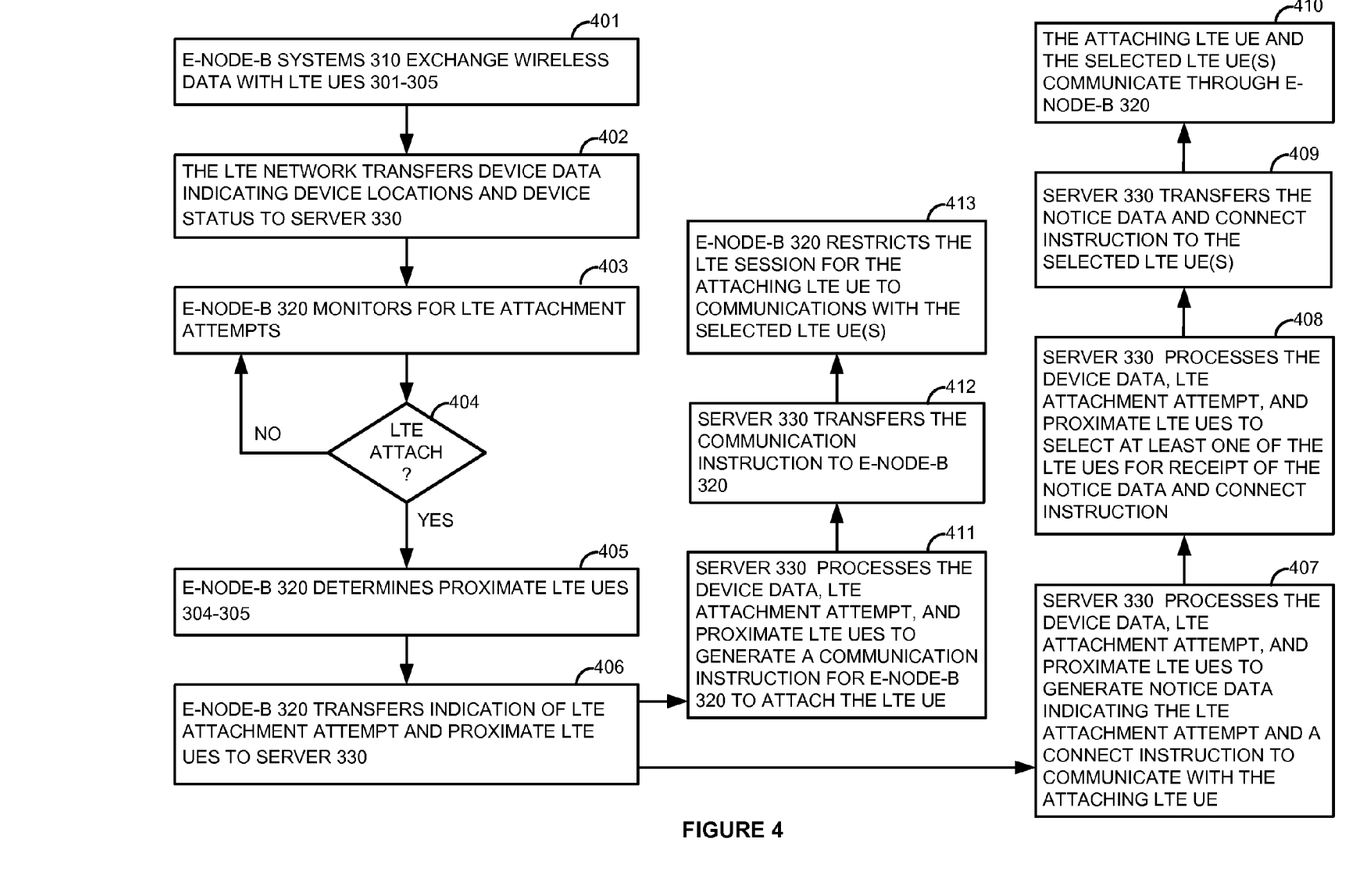
FIG. 4 illustrates the operation of a Long Term Evolution (LTE) system to distribute notice data indicating a trigger condition among a group of wireless communication devices.

FIG. 4 illustrates the operation of communication system 300 to distribute notice data indicating a proximate LTE attachment among LTE UEs 301-305. LTE eNodeB systems 310 exchange wireless data with LTE UEs 301-305 (401). The LTE network transfers device location and status data to server 330 (402). For example, UEs 301-305, eNodeB systems 310, and/or MME 342 may transfer device location data for UEs 301-305 to server 330. MME 342 may transfer on-net/off-net status and active/idle mode status for UEs 301-305 to server 330. UEs 301-305, gateways 341, MME 342, and/or IMS 345 may transfer application status data to server 330. UEs 301-305, eNodeB systems 310, and/or MME 342 may transfer mobility status data for UEs 301-305 to server 330. UEs 301-305, eNodeB systems 310, and/or MME 342 may transfer wireless signal quality data to server 330. UEs 301-305 may transfer their calendar data to server 330. PCRF 343 and/or OCS 344 may transfer billing and accounting status for UEs 301-305 to server 330. MME 342, PCRF 343, and/or IMS 345 may transfer Quality-of-Service (QoS) priorities and user instructions for UEs 301-305 to server 330.

LTE eNodeB 320 monitors the air for LTE attachment attempts by LTE UEs (403). If eNodeB 320 detects an LTE attachment attempt (404), then eNodeB 320 determines the currently proximate LTE UEs—UEs 304-305 in this example (405). LTE eNodeB 320 transfers an indication of the attachment attempt and the currently proximate UEs 304-305 to server 330 (406).

Server 330 processes the device location and status data, the indication of the LTE attachment attempt, and the indication of proximate UEs 304-305 to generate notice data indicating the LTE attachment attempt and a connect instruction offering a communication session with the attaching LTE UE (407). The notice data may identify the attaching LTE UE and offer options for audio, video, and messaging sessions with the attaching LTE UE—including conference sessions with other selected UEs.

Server 330 also processes the device location and status data, the indication of the LTE attachment attempt, and the indication of proximate UEs 304-305 to select one or more UEs for receipt of the notice data and connect instruction (408). The selection of UE(s) to receive the notice data and connect instruction may vary based on several factors including: idle mode status, mobility status, wireless signal quality, device calendar data, user instructions, device priorities, device status, device location, and the like.

For example, server 330 may select a closest UE for the notice and possible connection based on device location data for UEs 301-305. Server 330 may select an on-net/idle UE for the notice and possible connection based on on-net/off-net status and active/idle mode status for UEs 301-305. Combinations could be used, so server 330 may select the closest on-net/idle mode UE for the notice and possible connection.

Server 330 may select a UE running a particular application (like web surfing or email). Server 330 may avoid a UE running a particular application (like voice calling). Server 330 may avoid UEs that are mobile. Server 330 may select a UE with the best wireless signal quality. Server 330 may select an on-net UE with an open calendar at the current time. Server 330 may select an on-net UE having the most available billing credits or quotas. Server 330 may avoid UEs having the least available billing credits or quotas. Server 330 may select an on-net UE with a given QoS priorities. Various factors, combinations, weights, and data may be processed in this manner to select UEs for notice and communication. Various factors may be weighted, normalized, and summed to score and compare candidate UEs.

Server 330 transfers the notice data indicating the LTE attachment attempt and the connect instruction to the selected UE(s) (409). The attaching LTE UE and the selected UEs communicate through eNodeB 320 (410). The communications could be an audio session, video session, messaging session, or the like that is initiated by the selected UE(s) through IMS 345 responsive to the connect instruction.

Server 330 also processes the device location and status data, the indication of the LTE attachment attempt, and the indication of proximate UEs 304-305 to generate a communication instruction for eNodeB 320 (411). The instruction may direct eNodeB 320 to complete the LTE attachment for the LTE UE. The instruction may direct eNodeB 320 to restrict the attached LTE UE to communications with the selected UE(s). Server 330 transfers the communication instruction to eNodeB 320 (412). LTE eNodeB 320 may restrict the attached LTE UE to communications with only the selected UE(s) (413) and may interact with eNodeB systems 310 or MME 342 to implement the restriction.

Figure 5:
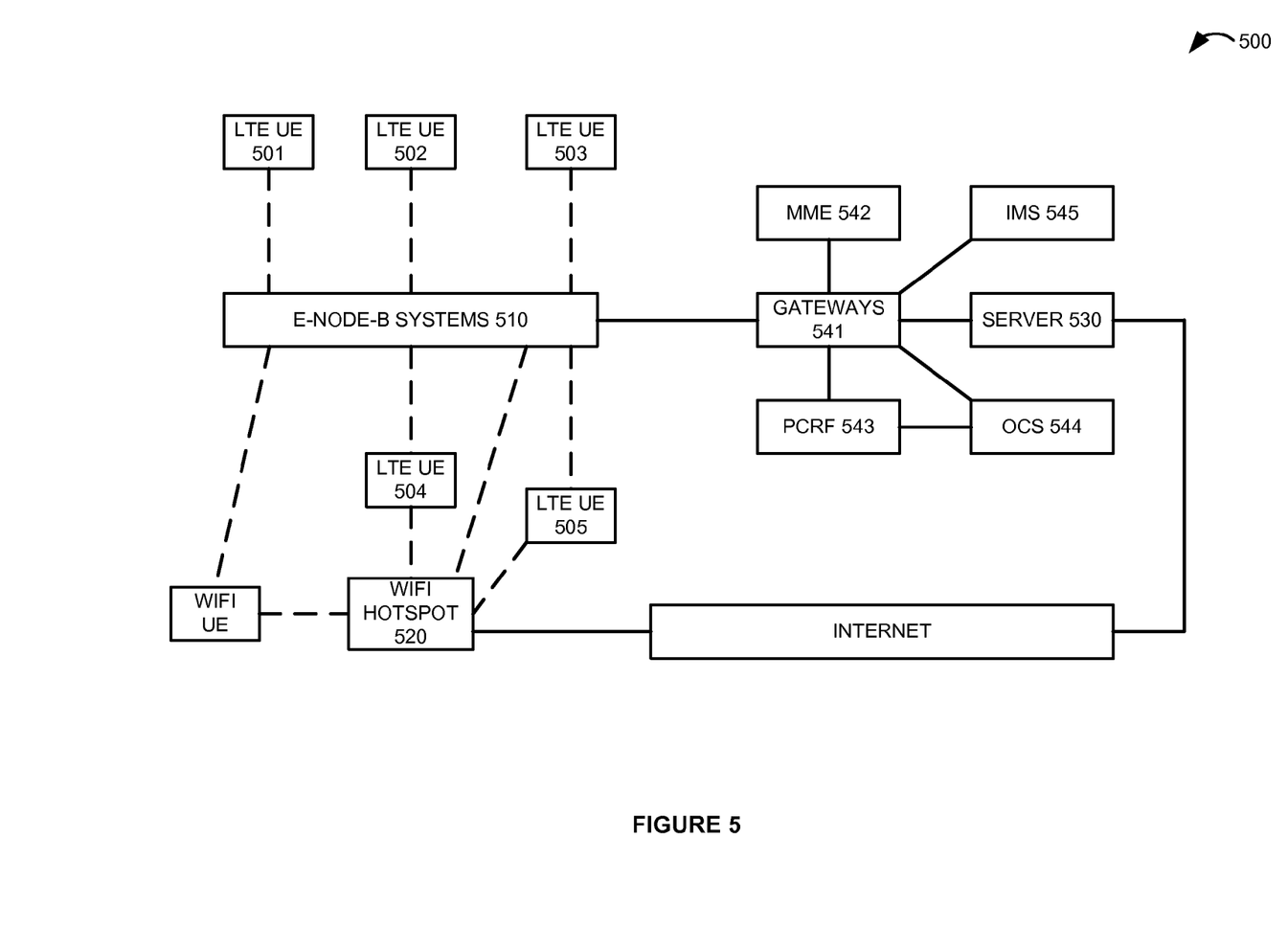
FIG. 5 illustrates a Long Term Evolution (LTE) and Wireless Fidelity (WiFi) system to distribute notice data indicating a trigger condition among a group of wireless communication devices.

FIG. 5 illustrates communication system 500 to distribute notice data indicating a trigger condition among LTE UEs 501-505. LTE UEs 501-505 are also WiFi capable. Communication system 500 comprises LTE UEs 501-505, LTE eNodeB systems 510, WiFi hotspot 520, server 530, Gateways 541 (such as service gateways, packet data network gateways, 2G/3G gateways, and WiFi gateways), MME 542, PCRF 543, OCS 544, and IMS 545. In communication system 500, WiFi hotspot 520 is an example of sensor system 120 discussed above, although sensor system 120 may take other forms.

LTE eNodeB systems 510 exchange wireless data with LTE UEs 501-505. WiFi hotspot 520 exchanges wireless data with proximate LTE UEs 504-505. Although a static situation is depicted, UEs 501-505 move around and may or may not be geographically proximate to WiFi hotspot 520 at any given time. UEs 501-505 may or may not be in communication with WiFi hotspot 520 at any given time. Likewise, UEs 301-305 may or may not be in communication with eNodeB systems 510 at any given time.

Communication system 500 generates usage data that characterizes the LTE communications with UEs 501-505. Communication system 500 selects device location and status data from the usage data and transfers the device location and status data to server 530. Device location data for UEs 501-505 may comprise device geographic coordinates or the geographic coordinates of a bounded geographic area like a serving wireless sector. UEs 501-505, eNodeB systems 510, and MME 542 can supply device location data.

In addition to location data, MME 542 can supply on-net/off-net status and active/idle mode status for UEs 501-505. UEs 501-505, gateways 541, MME 542, and IMS 545 can supply application status data that describes the applications currently running in UEs 501-505. UEs 501-505, eNodeB systems 510, and MME 542 can supply mobility status data that indicates velocities or velocity classes for UEs 501-505. UEs 501-505, eNodeB systems 510, and MME 542 can supply wireless signal quality data that characterizes LTE signal strength, frequency band, throughput, jitter, and the like. UEs 501-505 can supply their calendar data indicating user appointments and time conflicts. PCRF 543 and OCS 544 can supply billing and accounting status for UEs 501-505. MME 542, PCRF 543, and IMS 545 can supply QoS priorities and user instructions for UEs 501-505.

WiFi hotspot 520 detects a WiFi attachment attempt by a WiFi UE. In response to WiFi attachment attempt detection, WiFi hotspot 520 determines the currently proximate LTE UEs—UEs 504-505 in this example. WiFi hotspot 520 transfers an indication of the attachment attempt and the currently proximate UEs 504-505 to server 530. WiFi hotspot 520 may use eNodeB systems 510 or an Internet link for the transfer.

Server 530 processes the device location and status data, the indication of the WiFi attachment attempt, and the indication of the proximate UEs 504-505 to generate the notice data indicating the WiFi attachment attempt. Server 530 also processes this data to select at least one of UEs 501-505 for receipt of the notice data. The selection of UEs to receive the notice data may vary based on several factors including: idle mode status, mobility status, wireless signal quality, device calendar data, user instructions, device priorities, device status, device location, and the like. Server 530 transfers the notice data indicating the WiFi attachment attempt to the selected UEs over eNodeB systems 510, although an internet link and WiFi hotspot 520 may also be used.

Figure 6:
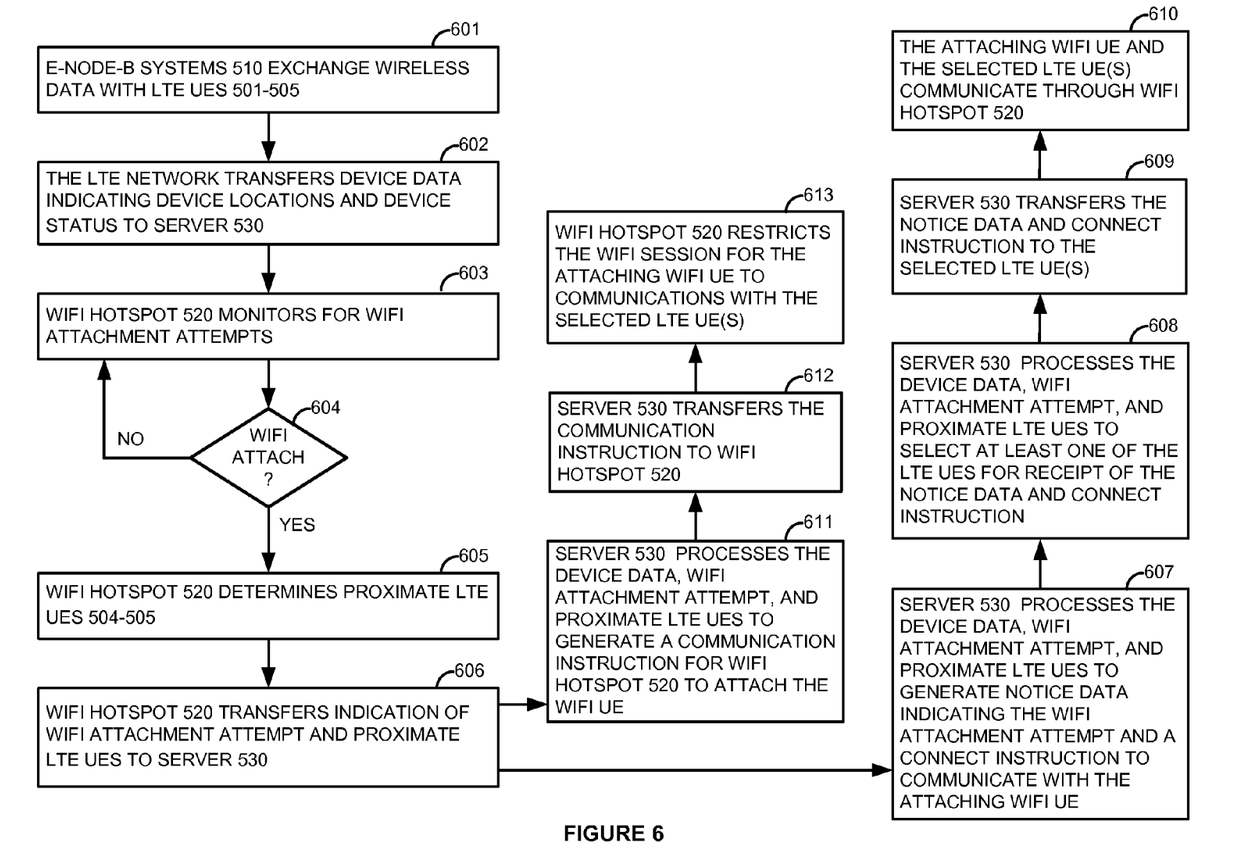
FIG. 6 illustrates the operation of a Long Term Evolution (LTE) and Wireless Fidelity (WiFi) system to distribute notice data indicating a trigger condition among a group of wireless communication devices.

FIG. 6 illustrates the operation of communication system 500 to distribute notice data indicating a proximate WiFi attachment attempt among LTE UEs 501-505. LTE eNodeB systems 510 exchange wireless data with LTE UEs 501-505 (601). The LTE network transfers device location and status data to server 530 (602). For example, UEs 501-505, eNodeB systems 510, and/or MME 542 may transfer device location data for UEs 501-505 to server 530. MME 542 may transfer on-net/off-net status and active/idle mode status for UEs 501-505 to server 530. UEs 501-505, gateways 541, MME 542, and/or IMS 545 may transfer application status data to server 530. UEs 501-305, eNodeB systems 510, and/or MME 542 may transfer mobility status data for UEs 501-505 to server 530. UEs 501-505, eNodeB systems 510, and/or MME 542 may transfer LTE wireless signal quality data to server 530. UEs 501-505 may transfer their calendar data to server 530. PCRF 543 and/or OCS 544 may transfer billing and accounting status for UEs 501-505 to server 530. MME 542, PCRF 543, and/or IMS 545 may transfer QoS priorities and user instructions for UEs 501-505 to server 530.

WiFi hotspot 520 monitors the air for WiFi attachment attempts by a WiFi UE (603). If WiFi hotspot 520 detects a WiFi attachment attempt (604), then WiFi hotspot 520 determines the currently proximate LTE UEs—UEs 504-505 in this example (605). WiFi hotspot 520 transfers an indication of the WiFi attachment attempt and the currently proximate UEs 504-505 to server 530 (606).

Server 530 processes the device location and status data, the indication of the WiFi attachment attempt, and the indication of proximate UEs 504-505 to generate notice data indicating the WiFi attachment attempt and a connect instruction offering a communication session with the attaching WiFi UE (607). The notice data may identify the attaching WiFi UE and offer options for audio, video, and messaging sessions with the attaching WiFi UE—including conference sessions with other selected LTE UEs.

Server 530 also processes the device location and status data, the indication of the WiFi attachment attempt, and the indication of proximate UEs 504-505 to select one or more UEs for receipt of the notice data and connect instruction (608). The selection of UE(s) to receive the notice data may vary based on several factors including: idle mode status, mobility status, wireless signal quality, device calendar data, user instructions, device priorities, device status, device location, and the like.

For example, server 530 may select a closest LTE UE for the notice and possible connection based on device location data for UEs 501-505. Server 530 may select an on-net/active UE for the notice and possible connection based on on-net/off-net status and active/idle mode status for UEs 501-505. Combinations could be used, so server 530 may select the closest on-net/idle mode UE for the notice and possible connection.

Server 530 may select a UE running a particular application (like web surfing or email). Server 530 may avoid a UE running a particular application (like voice calling). Server 530 may avoid UEs that are mobile. Server 530 may select a UE with the best wireless signal quality. Server 530 may select an on-net UE with an open calendar at the current time. Server 530 may select an on-net UE having the most available billing credits or quotas. Server 530 may avoid UEs having the least available billing credits or quotas. Server 530 may select an on-net UE with a given QoS priority. Various factors, combinations, weights, and data may be processed in this manner to select UEs for notice and communication.

Server 530 transfers the notice data indicating the LTE attachment attempt and the connect instruction to the selected UE(s) (609). The attaching LTE UE and the selected UEs communicate through WiFi hotspot 520 (610). The communications could be an audio session, video session, messaging session, or the like that is initiated by the selected LTE UE through IMS 545 responsive to the connect instruction.

Server 530 also processes the device location and status data, the indication of the WiFi attachment attempt, and the indication of proximate UEs 504-505 to generate a communication instruction for WiFi hotspot 520 (611). The instruction may direct WiFi hotspot 520 to complete the WiFi attachment for the WiFi UE. The instruction may direct WiFi hotspot 520 to restrict the attached WiFi UE to communications with the selected LTE UE(s). Server 530 transfers the communication instruction to WiFi hotspot 520 (612). WiFi hotspot 520 restricts the attached WiFi UE to communications with only the selected UE(s) (613) and may interact with eNodeB systems 510 or MME 542 to implement the restriction.

Figure 7:
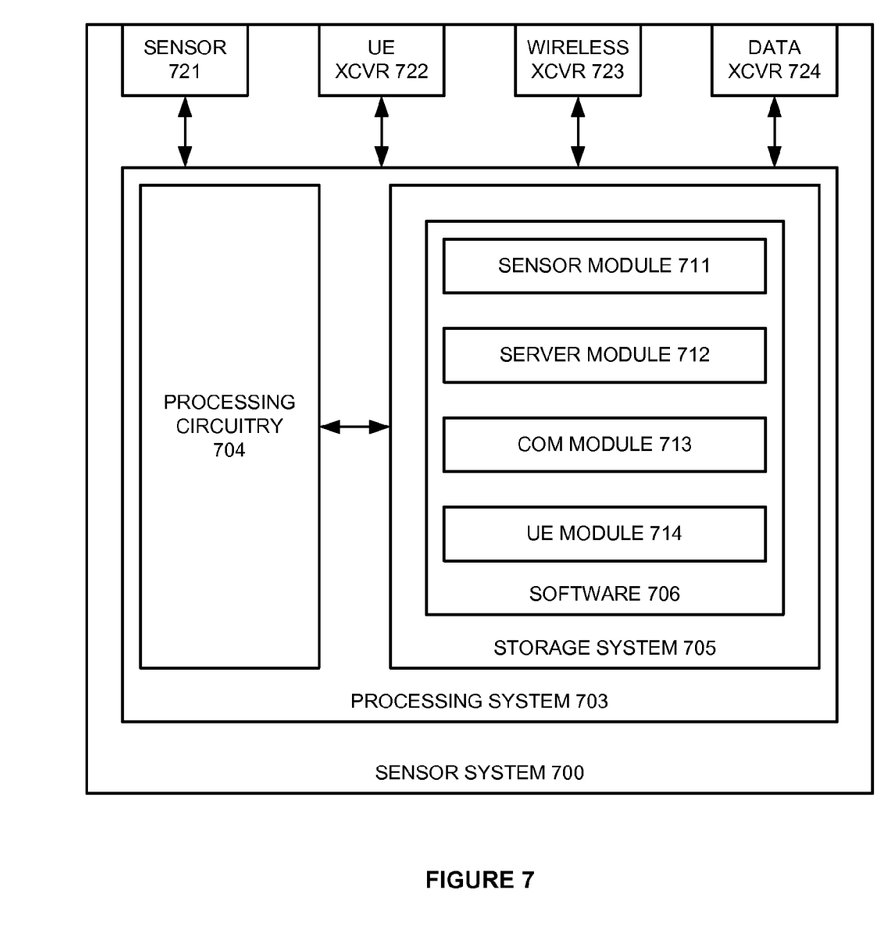
FIG. 7 illustrates a sensor system to distribute notice data indicating a trigger condition among a group of wireless communication devices.

FIG. 7 illustrates sensor system 700 to distribute notice data indicating a trigger condition among a group of wireless communication devices. Sensor system 700 is an example of sensor system 120, eNodeB 320, and WiFi hotspot 520, although these systems may use alternative configurations and operations. Sensor system 700 comprises processing system 703, sensor 721, and data communication transceivers 722-723. Processing system 703 comprises processing circuitry 704 and storage system 705. Storage system 705 stores software 706. Software 706 includes software modules 711-714. Some conventional aspects of sensor system 700 are omitted for clarity, such as power supplies, enclosures, and the like. Sensor system 700 may be centralized or distributed and may include various virtualized components.

Sensor 721 comprises equipment to detect proximate physical conditions. Examples include radio antennas, cameras, microphones, thermometers, and the like.

UE transceiver 722 comprises communication components, such as antennas, filters, amplifiers, signal processing circuitry, memory, software, and the like. UE transceiver 722 may use various wireless protocols to communicate with wireless communication devices operated by users. UE transceiver 722 detects proximate wireless communication devices (within its range). Sensor 721 and transceiver 722 may be integrated together.

Wireless network transceiver 723 comprises communication components, such as antennas, filters, amplifiers, signal processing circuitry, memory, software, and the like. Wireless network transceiver 723 may use various wireless protocols to communicate with wireless base stations and access points. Sensor 721 and transceiver 723 may be integrated together. Data network transceiver 724 comprises communication components, such as network ports, signal processing circuitry, memory, software, and the like. Data network transceiver 723 may use various data protocols to communicate with server systems.

In processing system 703, processing circuitry 704 comprises circuit boards, integrated circuitry, and associated electronics. Storage system 705 comprises non-transitory, machine-readable, data storage media, such as flash drives, disc drives, memory circuitry, servers, and the like. Software 706 comprises machine-readable instructions that control the operation of processing circuitry 704 when executed. Software 706 includes modules 711-714 and may also include operating systems, applications, utilities, databases, and the like. All or portions of software 706 may be externally stored on one or more storage media, such as flash drives, discs, servers, and the like.

When executed by processing circuitry 704, sensor module 711 directs circuitry 704 to detect trigger events, such as human presence and wireless attachments. When executed by processing circuitry 704, server module 712 directs circuitry 704 to transfer trigger indications and proximate device indications to a network server system. When executed by processing circuitry 704, communication module 713 directs circuitry 704 to communicate with attaching systems and possibly restrict the communications. UE module 714 directs circuitry 704 to communicate with proximate UEs. Modules 713-714 may be integrated together.

Figure 8:
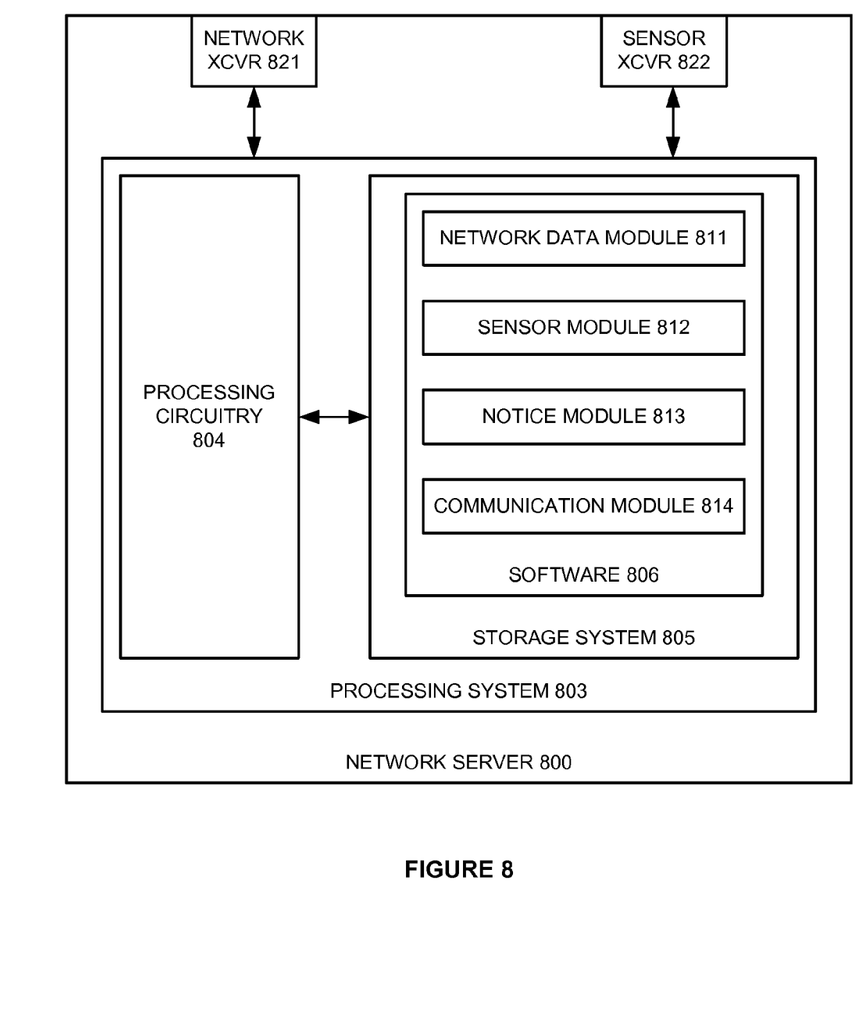
FIG. 8 illustrates a server system to distribute notice data indicating a trigger condition among a group of wireless communication devices.

FIG. 8 illustrates network server 800 to distribute notice data indicating a trigger condition among a group of wireless communication devices. Network server 800 is an example of systems 130, 330, and 530 although these systems may use alternative configurations and operations. Network server 800 comprises processing system 803 and data communication transceivers 821-822. Processing system 803 comprises processing circuitry 804 and storage system 805. Storage system 805 stores software 806. Software 806 includes software modules 811-814. Some conventional aspects of network server 800 are omitted for clarity, such as power supplies, enclosures, and the like. Network server 800 may be centralized or distributed and may include various virtualized components.

Network transceiver 821 and sensor transceiver 822 comprise communication components, such as network ports, signal processing circuitry, memory, software, and the like. Transceivers 821-822 may use various data protocols to communicate with network elements and sensor systems. Transceivers 821-822 may be integrated together.

In processing system 803, processing circuitry 804 comprises circuit boards, integrated circuitry, and associated electronics. Storage system 805 comprises non-transitory, machine-readable, data storage media, such as flash drives, disc drives, memory circuitry, servers, and the like. Software 806 comprises machine-readable instructions that control the operation of processing circuitry 804 when executed. Software 806 includes modules 811-814 and may also include operating systems, applications, utilities, databases, and the like. All or portions of software 806 may be externally stored on one or more storage media, such as flash drives, discs, servers, and the like.

When executed by processing circuitry 804, network data module 811 directs circuitry 804 to receive device location and status data from a wireless network. When executed by processing circuitry 804, sensor module 812 directs circuitry 804 to receive trigger indications and proximate device data from sensor systems. When executed by processing circuitry 804, notice module 813 directs circuitry 804 to process device data to select the wireless devices to receive the trigger notices and connect instructions. When executed by processing circuitry 804, communication module 814 directs circuitry 804 to transfer communication instructions to sensor systems. Modules 812 and 814 may be integrated together.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to distribute notice data indicating a trigger condition among a group of wireless communication devices, the method comprising:
    in a wireless communication network, exchanging wireless data with the wireless communication devices and transferring device data indicating device locations and device status for delivery to a network server system;
    in a sensor system, detecting the trigger condition and responsively determining a current set of proximate ones of the wireless communication devices to the sensor system and transferring indications of the trigger condition and the current set of the proximate wireless communication devices for delivery to the network server system;
    in the network server system, processing the device data, the indication of the trigger condition, and the indication of the current set of the proximate wireless communication devices to generate the notice data indicating the trigger condition and to select at least one of the wireless communication devices for receipt of the notice data;
    in the network server system, transferring the notice data indicating the trigger condition for delivery to the selected at least one of the wireless communication devices over the wireless communication network; and
    in the wireless communication network, wirelessly transferring the notice data indicating the trigger condition to the selected at least one of the wireless communication devices.

2. The method of claim 1 wherein:
    in the wireless communication network, transferring the device data indicating the device status comprises transferring idle mode status data; and
    in the network server system, processing the device data to select the at least one of the wireless communication devices for receipt of the notice data comprises processing the idle mode status data.

3. The method of claim 1 wherein:
    in the wireless communication network, transferring the device data indicating the device status comprises transferring mobility status data; and
    in the network server system, processing the device data to select the at least one of the wireless communication devices for receipt of the notice data comprises processing the mobility status data.

4. The method of claim 1 wherein:
    in the wireless communication network, transferring the device data indicating the device status comprises transferring wireless signal quality data; and
    in the network server system, processing the device data to select the at least one of the wireless communication devices for receipt of the notice data comprises processing the wireless signal quality data.

5. The method of claim 1 wherein:
    in the wireless communication network, transferring the device data indicating the device status comprises transferring calendar data; and
    in the network server system, processing the device data to select the at least one of the wireless communication devices for receipt of the notice data comprises processing the calendar data.

6. The method of claim 1 wherein, in the sensor system, detecting and transferring indications of the trigger condition comprises detecting and transferring indications of a Long Term Evolution (LTE) attachment attempt by an LTE User Equipment (UE), and further comprising:
    in the network server system, processing the device data, the indication of the LTE attachment attempt, and the indication of the current set of the proximate wireless communication devices to generate and transfer a connect instruction to communicate with the LTE UE over the sensor system for delivery to the selected at least one of the wireless communication devices;
    in the sensor system, processing the communication instruction, and in response, completing the LTE attachment for the LTE UE; and
    in the wireless communication network, wirelessly transferring the connect instruction to the selected at least one of the wireless communication devices.

7. The method of claim 6 wherein the communication instruction restricts LTE sessions for the LTE UE to communications with the selected at least one of the wireless communication devices, and further comprising:
    in the sensor system, processing the communication instruction, and in response, restricting the LTE sessions for the LTE UE to communications with the selected at least one of the wireless communication devices.

8. The method of claim 6 wherein the sensor system comprises an LTE eNodeB.

9. The method of claim 1 wherein, in the sensor system, detecting and transferring indications of the trigger condition comprises detecting and transferring indications of a Wireless Fidelity (WiFi) attachment attempt by WiFi User Equipment (UE), and further comprising:
    in the network server system, processing the device data, the indication of the WiFi attachment, and the indication of the current set of the proximate wireless communication devices to generate and transfer a connect instruction to communicate with the WiFi UE over the sensor system for delivery to the selected at least one of the wireless communication devices;

in the sensor system, processing the communication instruction, and in response, completing the WiFi attachment for the WiFi UE; and in the wireless communication network, wirelessly transferring the connect instruction to the selected at least one of the wireless communication devices.

10. The method of claim 9 wherein the communication instruction restricts WiFi sessions for the WiFi UE to communications with the selected at least one of the wireless communication devices, and further comprising:

in the sensor system, processing the communication instruction, and in response, restricting the WiFi sessions for the WiFi UE to communications with the selected at least one of the wireless communication devices.

11. A communication system to distribute notice data among a group of wireless communication devices, the communication system comprising:

a network server system;

a wireless communication network configured to exchange wireless data with the wireless communication devices and to transfer device data indicating device locations and device status for delivery to the network server system;

a sensor system configured to detect a trigger condition and responsively determine a current set of proximate ones of the wireless communication devices to the sensor system and to transfer indications of the trigger condition and the current set of the proximate wireless communication devices for delivery to the network server system;

the network server system configured to process the device data for the wireless communication devices, the indication of the trigger condition, and the indication of the current set of the proximate wireless communication devices to generate the notice data indicating the trigger condition, to select at least one of the wireless communication devices for receipt of the notice data, and to transfer the notice data for delivery to the selected at least one of the wireless communication devices over the wireless communication network; and the wireless communication network configured to wirelessly transfer the notice data to the selected at least one of the wireless communication devices.

12. The communication system of claim 11 wherein:

the wireless communication network is configured to transfer idle mode status data for the wireless communication devices; and the network server system is configured to process the idle mode status data to select the at least one of the wireless communication devices for receipt of the notice data.

13. The communication system of claim 11 wherein:

the wireless communication network is configured to transfer mobility status data for the wireless communication devices; and the network server system is configured to process the mobility status data to select the at least one of the wireless communication devices for receipt of the notice data.

14. The communication system of claim 11 wherein:

the wireless communication network is configured to transfer wireless signal quality data for the wireless communication devices; and the network server system is configured to process the wireless signal quality data to select the at least one of the wireless communication devices for receipt of the notice data.

15. The communication system of claim 11 wherein:

the wireless communication network is configured to transfer calendar data for the wireless communication devices; and the network server system is configured to process the calendar data to select the at least one of the wireless communication devices for receipt of the notice data.

16. The communication system of claim 11 wherein:

the sensor system is configured to detect and transfer indications of a Long Term Evolution (LTE) attachment attempt by an LTE User Equipment (UE);

the network server system is configured to process the device data, the indication of the LTE attachment attempt, and the indication of the current set of the proximate wireless communication devices to generate and transfer a connect instruction to communicate with the LTE UE over the sensor system for delivery to the selected at least one of the wireless communication devices;

the sensor system is configured to process the communication instruction, and in response, complete the LTE attachment for the LTE UE; and the wireless communication network is configured to wirelessly transfer the connect instruction to the selected at least one of the wireless communication devices.

17. The communication system of claim 16 wherein the communication instruction restricts LTE sessions for the LTE UE to communications with the selected at least one of the wireless communication devices, and wherein the sensor system is configured process the communication instruction, and in response, restrict the LTE sessions for the LTE UE to communications with the selected at least one of the wireless communication devices.

18. The communication system of claim 16 wherein the sensor system comprises an LTE eNodeB.

19. The communication system of claim 11 wherein:

the sensor system is configured to detect and transfer indications of a Wireless Fidelity (WiFi) attachment attempt by a WiFi User Equipment (UE);

the network server system is configured to process the device data, the indication of the WiFi attachment attempt, and the indication of the current set of the proximate wireless communication devices to generate and transfer a connect instruction to communicate with the WiFi UE over the sensor system for delivery to the selected at least one of the wireless communication devices;

the sensor system is configured to process the communication instruction, and in response, complete the WiFi attachment for the WiFi UE; and the wireless communication network is configured to wirelessly transfer the connect instruction to the selected at least one of the wireless communication devices.

20. The communication system of claim 19 wherein the communication instruction restricts WiFi sessions for the WiFi UE to communications with the selected at least one of the wireless communication devices, and wherein the sensor system is configured process the communication instruction, and in response, restrict the WiFi sessions for the WiFi UE to communications with the selected at least one of the wireless communication devices.

* * * * *